Patented May 13, 1941

2,241,514

UNITED STATES PATENT OFFICE 2,241,514

PROCESS FOR THE RECOVERY OF BERYLLIUM METAL

Gustav Jaeger, Neu-Isenburg, and Alfred Rudert, Frankfort-on-the-Main, Germany, assignors to Deutsche Gold und Silber Scheideanstalt vormals Roessler, Frankfort-on-the-Main, Germany, a corporation of Germany No Drawing. Application September 18, 1939, Serial No. 295,542. In Germany August 3, 1938

4 Claims. (Cl. 75—84)

Our invention relates to the recovery of beryllium metal from raw materials especially beryllium minerals which contain beryllium compounds together with other metal compounds. Hitherto the recovery of beryllium metal from such raw materials was carried out by a separation process, i. e. separating the beryllium in form of a suitable compound from the other metal compounds and, if necessary, subjecting the beryllium compound to a special purification process, whereupon the beryllium compound was worked up to metallic beryllium. This separation was carried out, for instance, by treating beryllium mineral with chemicals whereby one part of the mineral was dissolved, the other, however, remaining solid, whereupon the part containing the beryllium compound was worked up. Or the whole raw material was brought totally or nearly totally to solution and this solution afterwards, for instance, treated by selective precipitation in order to separate the beryllium compound or compounds from the compounds of the foreign metal impurities.

The pure beryllium compounds extracted after the aforementioned separation and purification methods were then recovered, for instance, by electrolysis, electrothermal reduction or conversion of the beryllium compound with elements more electropositive than beryllium.

The disadvantage of these former methods is that the separation of the beryllium compounds to be worked up to metallic beryllium from the compounds of the foreign metal impurities requires a mostly multi-step time consuming process as well as a purifying after-treatment.

The scope of our invention is the conversion of raw materials, such as beryllium minerals which contain beryllium compounds together with other metallic compounds into a mixture of metals and then separating the beryllium from the foreign metal impurities, hereby avoiding the otherwise necessary lengthy separation of the compounds.

In carrying out our invention we may proceed for instance, by subjecting the raw material containing beryllium compounds together with other metallic compounds, such as aluminium compounds, iron compounds and/or compounds of other heavy metals, sometimes silicium compounds, to a reduction process by which the beryllium compounds are converted into metallic beryllium and the other metallic compounds wholly or partly into their respective metals. Furthermore, the raw materials containing beryllium may be converted by chemical decomposition into a mixture of reducible metallic compounds by transformation of the raw material with the aid of halogen into a mixture of metallic halides, converting the latter by electrolysis of molten metals into a mixture of metallic beryllium together with other metals. According to our invention the recovery of the desired mixture of metals may be effected by treating the raw material with reactive metals, such as sodium, magnesium and the like.

The finishing of the metallic mixtures may be carried into effect with the aid of physic-mechanical separation processes or with chemical separation methods or with the combined use of both methods. In cases, where the metallic mixture is present in the form of a micaceous material powder or the like one may nearly always succeed a separation of the beryllium from the other metals by physic-mechanical separation methods, such as air sifting, flotation, sink and float processes or the like. In some cases sufficient separation may be yielded only by sieving the metallic mixture. The separation of the beryllium from the accompanying metals is carried out chemically in such a way that the mixed materials are treated with chemicals which are able to convert the foreign metal impurities into solution thereby leaving the beryllium unattacked. If desired our invention may be carried into effect also by converting the beryllium in a solution and afterwards separating this solution from the residue of the accompanying metals and working it up.

It has been proved advantageous to use the chemical separation process, if the mixture of the metals is present in the form of molten products as well as in the form of an alloy. It was found that the accompanying metal separated practically absolutely also from alloyed molten products, for instance Be-Al, whereby a residue of pure metallic beryllium remains which proves that the beryllium surprisingly does not protect the accompanying aluminium against the solvents.

In many cases there is an advantage in subjecting the metal mixture firstly to a physical-mechanical separation whereafter the resulting fraction, mainly consisting of beryllium, undergoes a further chemical separation.

By carrying out the chemical separation method solutions of alkaline substances and nitric acid have been found especially suitable. In this case, the beryllium metal will practically not be attacked or nearly not be attacked by a suitable concentrated nitric acid and by suitably concentrated alkaline solutions, whilst the other metals coming into question are easily soluble in nitric acid as well as in the alkaline solution. By using alkaline solutions, for instance, solutions of caustic soda, soda, potash and the like, beryllium may be separated from aluminium in an excellent manner. The other accompanying heavy metals such as iron may also be dissolved by treatment with nitric acid.

According to our invention we may proceed by liberating the metallic mixture in the form of micaceous material, powder or granulated metal of iron and other metals through a treatment with nitric acid. The residue consisting of beryllium, aluminium and sometimes silicium is then separated from the nitric solution and treated with an alkaline solution, for instance, diluted soda lye for the removal of aluminium and if the case may be, silicium, so that the beryllium remains in a pure form as a practically unattacked residue.

The chemical separation process is carried into effect, for instance, with a 4 to 6 n/nitric acid. According to our invention it has been found that the nitric acid should be used only by room temperature, if necessary, with cooling and advantageously brought into contact with metallic mixture only for a short time. Such procedure enables to dissolve the iron and the other metals present without any considerable losses in beryllium. A treatment of the material with concentrated nitric acid leads to a passivation of the beryllium through the formation of a thin protecting oxide film on the beryllium metal, which protection is also sufficient for the subsequent treatment with diluted nitric acid.

As alkaline solution a sodium hydroxide of about 1 to 15%, preferably of about 5 to 10% or a suitably concentrated solution of sodium carbonate, potassium carbonate, or the like may be used. The treatment of the metallic mixture with alkaline solutions may be carried out at ordinary temperature. Working at elevated temperatures, for instance at about 90° C. may shorten the treatment.

The decomposition of mixtures containing beryllium, aluminium, iron and sometimes other metals with alkaline solutions and acids may be carried out in such a way that firstly the nitric acid and afterwards the alkaline solution is brought into effect or vice versa.

By carrying out our invention, we prefer to crush the metals, for instance, by conversion into drillings, granulated materials, powder, thin sheets or the like and then choosing the suitable reduction means, adjustment of the ratio of the quantities and the like for the reduction of the mixture or the metal compounds. Fusible products may also be converted into products of desired fineness by atomizing or spraying.

*Examples*

1. 25 kgrs. of a mixture of beryllium oxide, aluminium oxide and iron oxide recovered in a simple well known way from beryllium minerals, consisting of about 10 kgrs. BeO, 13 kgrs. $Al_2O_3$ and 2 kgrs. $Fe_2O_3$ are mixed with 25 kgrs. of carbon and 4 kgrs. of pitch. The mixture is formed into briquettes, carburised and heated in a flow of chlorine until no vapors of metallic chlorides pass off any more. The temperature may be about 1200° C. and more. The mixture of the escaping vapors of metallic chlorides is condensed together, the condensate mixed with NaCl and electrolysed at a suitable temperature, for instance between 300 and 800° C., by using graphite anodes. Hereby the metals are separated in the form of a mixture of micaceous material consisting of Be, Al and Fe. After separation from the electrolyte the mixture of the metallic micaceous material is floated, thus enabling a nearly perfect separation of the light beryllium metal from the heavier aluminium and iron. If the so separated beryllium metal contains yet more other metals in too large quantities or a beryllium of special purity is desired, the beryllium metal may be subjected to a further chemical purification after the mechanical purification, in such a way that it is treated under stirring at ordinary or slightly elevated temperature with a soda lye of about 5% till the aluminium is completely dissolved. Iron and/or other heavy metals may be eliminated by washing with nitric acid, for instance 3 to 5 n/nitric acid. The chemical treatment causes only very slight losses of the dissolved beryllium for example about 0.23%. The remaining beryllium metal is of a considerable purity.

2. A mixture of beryllium fluoride and aluminium fluoride is electrolysed in known manner in the presence of alkali fluoride using thereby temperatures of about 1200° C. The mixture of the molten metals is then crushed. If the regulus is sufficiently brittle the crushing may be carried out by grinding or pounding, otherwise for instance also by cutting. The crushed material is stirred at ordinary or elevated temperature with an 8% soda lye until the dissolution of the by products ceases. The beryllium remains in a very pure form. In the form of reguli or in a coarsely crushed form the residues will be purified by a treatment with nitric acid or alkali according to our invention, in order to recover a pure beryllium metal.

What we claim is:

1. In a process for the recovery of beryllium from raw materials which contain beryllium compounds together with aluminum, silicon and iron compounds, the steps which comprise converting the metal compounds in such mixture into halides, subjecting such halides to a reduction to obtain elemental beryllium in admixture with other metals and then separating the accompanying metals from the elemental beryllium.

2. In a process for the recovery of beryllium from raw materials which contain beryllium compounds together with aluminum, silicon and iron compounds, the steps which comprise converting the metal compounds in such mixture into halides, subjecting such halides to a reduction to obtain elemental beryllium in admixture with other metals and then dissolving aluminum from the mixture with sodium hydroxide to concentrate the elemental beryllium.

3. In a process for the recovery of beryllium from raw materials which contain beryllium compounds together with aluminum, silicon and iron compounds, the steps which comprise converting the metal compounds in such mixture into halides, subjecting such halides to a reduction to obtain elemental beryllium in admixture with other metals and then treating the metal mixture with nitric acid to free the elemental beryllium from iron.

4. In a process for the recovery of beryllium from raw materials containing beryllium oxide and aluminum and iron oxides, the steps which comprise heating the raw material in admixture with carbon in a stream of chlorine to convert the metal compounds into chlorides, reducing such chlorides to obtain elemental beryllium in admixture with other metals and separating the other metals from the elemental beryllium.

GUSTAV JAEGER.
ALFRED RUDERT.